United States Patent Office 3,453,292
Patented July 1, 1969

---

3,453,292
METHOD OF MANUFACTURING TETRACARBOXYLIC ACID DIANHYDRIDE
Masahiro Izumi and Hiroshi Shima, Osaka, Shigeru Matsumura, Nishinomiya-shi, and Asano Nobuyuki, Itami-shi, Japan, assignors to Sumitomo Electric Industries, Ltd., Osaka, Japan, a corporation of Japan
No Drawing. Filed June 29, 1965, Ser. No. 468,130
Claims priority, application Japan, July 7, 1964,
39/38,797
Int. Cl. C07d 5/32, 3/00, 5/00
U.S. Cl. 260—346.3  3 Claims

---

ABSTRACT OF THE DISCLOSURE

Tetracarboxylic acid anhydride having two amide bonds is synthesized by having only the acid halide radicals and the amino radicals react with each other in tricarboxylic acid anhydride monoacid halide and an organic diamine at a temperature of −20° C. or lower. Tetracarboxylic acid dianhydride obtained in this way and the organic diamine, in a molar ratio of the former to the latter of, 2:1 or less are caused to react with each other in an organic polar solvent to obtain a polyamide having such a chemical constitution that the amide bond and the amic acid bond are repeated regularly. By heating the polyamide having this chemical constitution, the amide bond and the imide bond appear regularly in the chain of macromolecules. The polyamide thus obtained is useful as an electrical insulating varnish.

---

The principal object of this invention is to provide new polymeric materials having the constitution wherein the amide bond and imide bond appear alternately and regularly in the chain of macromolecules.

Another object of this invention is the provision of a method of manufacturing the new polymeric materials having the constitution wherein the amide bond and imide bond appear regularly in the chain of macromolecules.

Another object of this invention is to provide a method of manufacturing products such as new insulating varnish made primarily from the polymeric material, manufactured in accordance with this invention, insulated wire to which the coating of the above mentioned insulating varnish has been applied by baking sheet article made of such polymeric materials, or glass cloth and asbestos etc. to which polymeric material has been applied by immersion, drying or subsequent baking.

Another object of this invention is the provision of a particular tetracarboxylic acid dianhydride, preferred for manufacturing said polymeric materials and a method of manufacture thereof.

Generally, a compound comprising the acid halide radical has, as is well known, the advantage in that it is highly reactive with the amines in a polar solvent, producing an amide bond, on the other hand, there is the disadvantage in that it can not, with ease, be manufactured commercially on a large industrial basis, because complete removal of the halogenated hydrogen, produced by this reaction, takes place when a high molecule composition has been synthesized from a compound containing two acid halide radicals and diamine.

Earlier, it was a matter of great difficulty to cause the reaction of only one of the functional groups of a compound containing both an acid anhydride radical and acid halide radical in the molecular structure and any one of the amines which are to be interreacted together.

The present invention is characterized by a polymeric material having a composition wherein the amide bond and the imide bond appear regularly in the chain of the polymer and can be obtained by first preparing the tetracarboxylic acid dianhydride having the amide bond in the molecule caused by the reaction of only the acid halide radical, resulting from choice of proper conditions for reaction, effecting this reaction in an organic solvent between the tricarboxylic acid having the functional groups of anhydride and monoacid halide and one or more diamines.

In other words, according to the preferred embodiment of this invention, the hydrogen halide produced during the reaction can be easily removed by first obtaining the synthesized tetracarboxylic acid dianhydride having the amide bond in the molecule resulting from interreaction between the tricarboxylic acid having the functional groups of anhydride and acid halide, and diamine and then separating out only the dianhydride. This can be illustrated by the following series of reaction process.

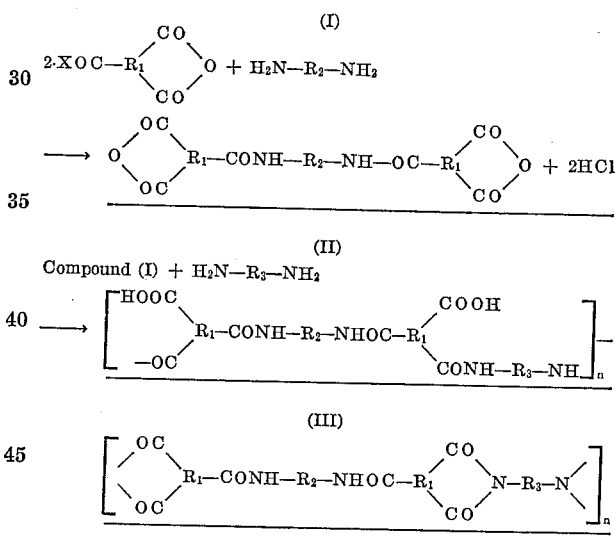

Where X is one of such halogens as fluorine, chlorine, bromine or the like, and $R_1$ denoted a trivalent radical of aromatic compound and aliphatic compound or a combination set up by both of the said compounds, and both $R_2$ and $R_3$ are divalent radical of aliphatic compound, alicyclic compound and aromatic compound or a combination of two or more of them. Diamine ($H_2N-R_2-NH_2$) for use in Step I need not be essentially limited to a primary diamine and may be, for example, a cyclic secondary diamine, such as piperazine.

In more detailed description of this embodiment of present invention, for reaction between tricarboxylic acid having the functional groups of anhydride and monoacid halide and diamine, the tricarboxylic acid is first dissolved into a solvent, such as ethylene-dichloride in a reaction vessel, which is then placed into the cooling bath (containing e.g. methyl alcohol-Dry Ice system) and cooled down to below —20° C., preferably below —50° C. Meanwhile, a quantity of diamine, one half or less of that of the tricarboxylic acid in the term of mole ratio is added into a solvent, such as N,N-dimethylformamide, N,N-dimethylacetamide, dimethylsulfoxide, dimethylsulfone, N - methyl - 2 - pyrrolidone or a similar solvent to obtain the solution, which is then slowly added, dropwise, to the previously prepared solution of tricarboxylic acid to cause a reaction which in turn serves to slacken another reaction of acid anhydride and permit only reaction between acid halide radical and amine.

The compound obtained can be purified through, e.g., the recrystallization process, and hydrogen halide produced by the reaction mentioned in Step I can be separated from solution.

Example 1

18.5 gr. (0.088 mole) of 4-chloroformyl phthalic anhydride were completely dissolved in 166 gr. of ethylene dichloride contained in a 4-necked reaction flask equipped with the stirrer, thermometer, dropping funnel and calcium chloride tube. Solution is kept in the flask and is then put in a cooling bath containing methyl alcohol-Dry Ice system to be cooled down to below about —50° C. being continuously stirred. At this time the ethylene dichloride solution becomes partially solidified. Addition of drops of a liquid mixture of 40 gr. of N,N-dimethylformamide and 4.3 gr. (0.04 mole) of p-phenylene diamine dissolved therein is added to the first solution with stirring constantly maintained. There results, in gradual progress a further reaction accompanied by the simultaneous dissolution of the solid formed. Continued stirring of the solution, so obtained, for a period of another three hours after completion of the addition of drops of the above mentioned second mixture is followed by obtainment of light yellow precipitate. Stirring is then continued until the end of total reaction is reached and the flask is maintained undisturbed until it is restored to room temperature. Above mentioned precipitate is collected through the suction filter and then washed quickly with N,N-dimethylformamide and finally dried for a period of one day at a temperature of 80° C. and under a reduced pressure of 5 mm. Hg. This practice enables to obtain the first compound in the right hand side of Step I where $R_1$ is

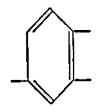

and $R_2$ is

The acid number of the compound obtained was determined by applying back titration with an aqueous solution of 0.1 N-KOH and that of 0.1 N-HCl and as a result, the following acid number was obtained:
Experimental value 501 (calculated value 491).

With respect to the said compound, presence of both acid anhydride radical and amide bond has been confirmed spectrographically through the pattern of absorbed spectrum of infrared.

Example 2

7.9 gr. (0.04 mole) of 4,4-diamino-diphenylmethane and 18.5 gr. (0.088 mole) of 4-chloroformyl phthalic anhydride were added to cause interreaction in a method similar to that in Example 1, which resulted in producing compound (I). (In its constitutional formula $R_1$ is

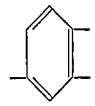

and $R_2$ is

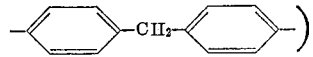

The compound so obtained was found nonmelting at a temperature as high as about 360° and soluble in such a solvent as N,N - dimethylformamide, N,N - dimethylacetamine, m-cresol and the like. Determination of the acid number gave 416 (calculated value 410).

Example 3

8 gr. (0.04 mole) of 4,4'-diamino diphenyl ether and 18.5 gr. (0.088 mole) of 4-chloroformyl phthalic anhydride were also reacted in the same process as in preceding Example 1, resulting in obtainment of a precipitate having a melting point of 334–335° C. and a determined acid number of 405 (calculated value 409.5). Contained nitrogen was quantitatively determined in accordance with Kjeldahl's method with the result of obtained N content of 5.08 (calculated value 5.11). The compound comprising the precipitate had been found having an absorbed spectrum of infrared indicating the presence of the radial of acid anhydride and amide bond.

Allowing the reaction for tetracarboxylic acid dianhydride obtained pursuant to preceding three examples of embodiment of this invention with a diamine belonging to aliphatic compound, alicyclic compound, aromatic compound or a composite of any two or more of the said compounds under use of such polar solvents as N,N-dimethylformamide, N,N-dimethylacetamide, N-methyl-2-pyrrolidone, dimethylsulfide, dimethylsulfone, pyridine and the like, a compound (II) of polyamide-acid can be obtained. And this compound can be converted into an insoluble and non-melting compound (III) of polyamide inside by causing dehydration by a chemical or physical process, either after or during formation into film, sheet and fiber coating material.

Application of the solution of polymeric material thus obtained, for example, the surface of an electric conductor and subsequent baking the same pursuant to a conventional coating technique enables one to obtain an insulated wire, coated with the layer of resin of polyamide-imide or modified polyamide-imide having five-membered imide ring constitution in the constitutional formula, and brings out an improved dielectric strength, excellent chemical resistance and moisture proofness for an electric component when treated by impregnation with the insulating varnish herein disclosed and described.

If required, the solution of polymeric material can be converted, after being coated on the surface and subsequently baked into modified polyamide-imide, after addition thereto of an epoxy resin, such as, polyisocyanate or masked polyisocyanate.

The said solution can be diluted with an aromatic hydrocarbon such as solvents naphtha, xylene, benzene, toluene or the like for adjustment of the viscosity to a proper level, most suited for ease of operation in a particular application.

Example 4

4.2 gr. (0.0212 mole) of 4,4-diaminodiphenylmethane were dissolved in 64 gr. of N,N-dimethylacetamide contained in 100 cc. in a 4-necked reaction flask equipped with a stirrer, thermometer and calcium chloride tube. Dropwise addition of 11.58 gr. (0.0212 mole) of a compound prepared in accordance with Example 2 was added to the flask at a room temperature under continuous stirring giving rise to a reaction accompanied by heat of reaction.

Additional five hours' reaction under continued mechanical stirring results in production of viscous solution of a polymeric material.

After being spread in a thin layer over a plate of glass, the said solution is heated at 200° C. in the thermostatic oven for a continuous period of 1 hour. By this heating practice, the layer of solution thus applied was turned into a light yellow film which has been found to be tough and highly flexible and showing no change of appearance whatsoever even after continuous immersion in 3% aqueous solution of caustic soda for 24 hours.

Example 5

Viscous solution of a polymeric material was obtained, as in the preceding Example 4, from 4.4 gr. (0.022 mole) of 4,4'-diaminodiphenylether, and 12.06 gr. (0.022 mole) of the compound obtained in accordance with the Example 3 and thereto added 64 gr. of N,N-dimethylacetamide.

A film of the solution thus prepared was then obtained in a similar manner as that in the preceding Example 4. This film was found to be tough and highly flexible and showing no change of appearance after continuous immersion for 48 hours in 3% aqueous solution of caustic soda or in sulfuric acid with a specific gravity of 1.2 and exhibited hardly any loss of mass as confirmed by determination of heating loss in a nitrogen atmosphere with the thermobalance at a heating temperature not exceeding 300° C.

The film obtained was found to have tensile strength of 11.8 kg. mm.$^2$, elongation of 8.4%, insulation resistance of $9.5 \times 10^{15}$ Ω-cm. and breakdown voltage of 12.4 kv./0.1 mm.; these properties were found changed, respectively, to 13.8 kg./mm.$^2$ of tensile strength, 5.8% of elongation $9.0 \times 10^{15}$ Ω-cm. of insulation resistance and 11.0 kv./0.1 mm. of breakdown voltage after deterioration by heating in the air was continued for 30 days at a temperature of 250° C. This change as compared with the data before heating for deterioration is not substantial. From this, the tested film made of the invented polymeric material may be appreciated for its excellent characteristic thermal stability.

The intrinsic viscosity (limiting viscosity number) characterizing the polymer was found to be 0.8.

Example 6

A viscous solution of polymeric material was obtained from 4.2 gr. (0.0212 mole) of 4,4'-diaminodiphenylmethane, 11.62 gr. (0.0212 mole) of the compound prepared in accordance with a method mentioned in the Example 3 and 65 gr. of N,N-dimethylacetamide. The film of such polymer, resulting from drying at 250° C. for a continuous period of 1 hour of the above mentioned solution spread over a plate of glass has been found flexible and tough and insoluble in a solvent such as m-cresol, dioxane, acetate, benzene, alcohol and the like and even in N,N-dimethylacetamide.

Example 7

The solution of polymeric material obtained in accordance with the practice described in the above Example 4 was applied to and then baked on the surface of 1 mmφ copper wire at a temperature of 450° C. and at a rate of 5.0 m./min., resulting in obtainment of the insulated wire with 0.04 mm. thick coating which was characterized by excellent heat resistance. Further characteristics of the polymer-coated wire obtained are listed in Table 1.

The solution of polymeric material was diluted in xylene to obtain the insulation coating of impregnation varnish type, which was subjected to testing conducted in a practice similar to that set forth in JIS–C–2103 (Method of Testing Insulating Varnish for Parts of Electric Equipments). The results of this testing are shown in Table 2.

Example 8

The solution of polymeric material obtained in accordance with the method described in the above Example 4 is mixed with 5 phr. of an epoxy resin (Epikote 1004, Shell Chemical Co.), an epoxy resin based on the diglycidyl ether of bisphenol A having an equivalent weight from 875 to 1025, and insulated wire was obtained by the process nearly equal to that mentioned in Example 7. The characteristics of the insulated wire obtained are listed in Table 1.

Example 9

6.6 phr. of Epikote 1004 were added to a solution of polymeric material prepared in accordance with the above mentioned Example 4. The mixture so obtained was then diluted with 300 gr. of solvent naphtha to obtain a new type of insulating varnish which was tested the same as that in Example 7 with the result of the testing shown in Table 2.

Example 10

The solution of polymeric material obtained in accordance with Example 5 is applied to and baked on the surface of the 1.0 mmφ copper wire in the same manner as the above mentioned Example 7. The characteristics of the obtained insulated wire are listed in Table 1.

The solution was used as an impregnating varnish without any additional processing, and then was tested the same way as in the above mentioned Example 7 with the results shown in Table 2.

Example 11

3 phr. of masked polyisocyanate were added to the solution of the polymeric material obtained in accordance with Example 5, resulting in a new insulating varnish which was in turn applied to and baked on a surface of the 1.0 mmφ copper wire in the same manner as in Example 7. The characteristics of this insulated wire are shown in Table 1.

Example 12

5 phr. of masked diisocyanate of 4,4'-diphenyletherdiisocyanate masked with phenol, was added to a solution of polymeric material obtained in accordance with Example 5, in order to provide a new type of the insulating varnish having the characteristics shown in Table 2, and as confirmed by the same testing conducted in the manner set forth in Example 7.

TABLE 1

| Test | Example 4 | Example 5 | Example 7 | Example 8 |
|---|---|---|---|---|
| Pin hole (straight) | 0 | 0 | 0 | 0. |
| Pin hole (wound on own dia.) | 0 | 0 | 0 | 0. |
| Heat shock, 250° C.—2 Hrs. Thermo plastic flow | Good when wound on own dia. | Good when wound on own dia. | Good when wound on own dia. | Good when wound on own dia. |
| Double cross applied weight, 5 kg. Temperature rise rate 1° C./2 min.; testing voltage 100 v. | Exceed 350° C | Exceed 350° C | Exceed 350° C | Exceed 350° C. |
| Heat aging (kv.): Heated at 250° C.— | | | | |
| At 0 Hr | 11.0 | 11.0 | 10.0 | 8.8. |
| After 24 Hr | 12.0 | 11.0 | 11.5 | 9.0. |
| After 120 Hr | 8.0 | 7.5 | 10.0 | 8.5. |
| Abrasion resistance load, 700 gr. Strokes (average) | 161 | 170 | 98 | 110. |
| Chemical resistance (immersion at 50° C.): | | | | |
| NaOH, 15%: | | | | |
| 24 Hr | Good | Good | Good | Good. |
| 120 Hr | do | do | do | Do. |
| H$_2$SO$_4$ (d.=1.2): 120 Hr | do | do | do | Do. |
| Solvent resistance: Testing solvent Ethanol+Toluene (1:1) (Boiled). | do | do | do | Do. |
| Refrigerant resistance (R–22) | do | do | do | Do. |

TABLE 2

| Test | Example 4 | Example 6 | Example 7 | Example 9 |
| --- | --- | --- | --- | --- |
| Appearance | Good | Good | Good | Good. |
| Bending strength (3 mm$\phi$ mandrel) | Not cracked | Not cracked | Not cracked | Not cracked. |
| Film thickness (center) (mm.) | 0.02 | 0.019 | 0.019 | 0.014. |
| Bottom/center | 1.21 | 1.12 | 1.18 | 1.10. |
| Oil resistance (Transformer oil, JIS No. 1) | Good | Good | Good | Good. |
| Dielectric breakdown, kv./0.1 mm.: | | | | |
| Room Temp | 9.8 | 10.0 | 12.4 | 11.0. |
| 250° C.: | | | | |
| After 24 Hr | 12.1 | 11.5 | 11.4 | 11.4. |
| After 120 Hr | 12.6 | 11.5 | 12.2 | 11.4. |
| After 240 Hr | 11.8 | 11.0 | 13.0 | 11.5. |
| Insulating resistance ($\Omega$-cm.): | | | | |
| Room Temp | $9.5 \times 10^{15}$ | $8.0 \times 10^{15}$ | $3.7 \times 10^{15}$ | $5.7 \times 10^{15}$. |
| 250° C.: | | | | |
| After 24 Hr | $10.0 \times 10^{15}$ | $11.0 \times 10^{15}$ | $8.8 \times 10^{15}$ | $9.2 \times 10^{15}$. |
| After 120 Hr | $14.0 \times 10^{15}$ | $12.8 \times 10^{15}$ | $12.5 \times 10^{15}$ | $11.0 \times 10^{15}$. |
| After 240 Hr | $9.8 \times 10^{15}$ | $10.1 \times 10^{15}$ | $9.0 \times 10^{15}$ | $9.5 \times 10^{15}$. |

Example 13

The sheets of 10 cm. x 12 cm. size glass cloth are immersed in a solution of polymeric material obtained in accordance with the process described in Example 5 for impregnation treatment and then was dried at a temperature of 140° C. Twelve (12) stacked sheets of the cloth thus immersed were compressed together by compression pressure continued for a continuous period of 2 hours at a temperature of 160° C. and under the pressure of 200 kg./cm.² to produce a single laminate.

Testing of this laminate, which had a thickness of 2.58 mm., specific gravity of 1.82 and resin content of 27.5%, revealed the characteristic of bending strength of 29.4 kg./mm.² and modulus of elasticity of 2,220 kg./mm.². Heating loss was found to be 1.5% at 200° C., 4.5% at 300° C., 5.5% at 350° C., 7.8% at 400° C. and 17% at 800° C. which justifies one to say that this means an excellent heat resistance which is equal to or higher than that compared of another laminate made of silicone resin-impregnated glass fibre, which laminate is believed to have the highest heat resistance ever known among all such products presently available in the market. This justification is based upon testing to check the thermal decomposition conducted with the thermobalance in a nitrogen atmosphere with a rate of temperature rise of 150° C./hr.

The laminate according to the present invention is excellent because of its unusually high chemical resistance and insensitivity to solvent action (solvent resistance); it is insoluble in solvents such as dimethylacetoamide, dimethylformamide, dimethylsulfoxide, benzene, solvent naphtha, styrene or the like, and is insensitive to diluted sulphuric acid and the diluted solution of caustic soda.

Example 14

The solution of polymeric material obtained through the process described in the above mentioned Example 4 was impregnated into a tissue of glass cloth which was then dried in the air at a room temperature. A stack of 12 sheets of so prepared glass cloth (10 cm. x 12 cm.) were then compressed together in order to obtain a single laminate the compression being for a continuous period of 2 hours under a pressure of 400 kg./cm.² at a temperature of 160° C.

Example 15

The glass cloth (BC–181–BHAAX, Nittobo Co.) was immersed in a solution of polymeric material prepared in accordance with Example 4 for impregnation and then was dried in air at room temperature. A stack of 12 sheets of 10 cm. x 12 cm. size glass cloth as dried were compressed together at a temperature of 160° C. and under a pressure of 400 kg./cm.² for a continuous period of 2 hours to produce a single laminate.

The laminate obtained had the thickness of 4.93 mm., specific gravity of 1.46 and resin content of 58.5% and was characterized by a bending strength of 22.0 kg./mm.² and a modulus of elasticity of 1,110 kg./cm.².

Although description of this invention has been made with a certain degree of particularity, it is to be understood that the present disclosure comprising this invention has been made only by way of examples and that numerous changes in the details of each embodiment may, of course, be resorted to without departing from the spirit and the scope of invention as hereinafter claimed.

What is claimed is:

1. A process for producing a tetracarboxylic anhydride represented by the formula

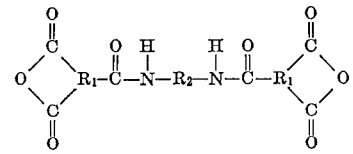

wherein $R_2$ represents a divalent radical defined below and wherein $R_1$ denotes a trivalent radical of an aliphatic or aromatic compound, which process comprises: reacting a diamine represented by the formula $R_2(NH_2)_2$ wherein $R_2$ represents a divalent radical of an aliphatic, alicyclic or aromatic compound with a tricarboxylic acid halide represented by the general formula

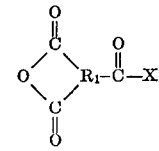

wherein $R_1$ has the same meaning as above and X represents a fluorine, chlorine or bromine atom; the reaction being conducted in a polar solvent in which the reactants are maintained at a temperature below about −20° C. during the period required for said reaction to be effected.

2. The method of claim 1 in which one of the reactants is 4-chloroformylphthalic anhydride.

3. The method of claim 1 wherein $R_1$ is

and $R_2$ is

or

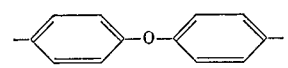

or

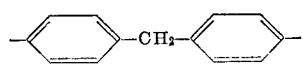

(References on following page)

References Cited

UNITED STATES PATENTS

| | | | |
|---|---|---|---|
| 3,182,073 | 5/1965 | Loncrini | 260—346.3 |
| 3,182,074 | 5/1965 | Loncrini | 260—346.3 |
| 3,260,691 | 7/1966 | Lavin | 260—78 |

FOREIGN PATENTS 570,858  7/1945  Great Britain.

SAMUEL H. BLECH, *Primary Examiner.*

PAUL LIEBERMAN, *Assistant Examiner.*

U.S. Cl. X.R.

260—32.6, 77.5, 47, 78, 268, 830